United States Patent
Sauerstein

(10) Patent No.: US 9,016,060 B2
(45) Date of Patent: Apr. 28, 2015

(54) EXHAUST-GAS SUPPLY DEVICE OF A TURBINE WHEEL OF AN EXHAUST-GAS TURBOCHARGER

(75) Inventor: Rolf Sauerstein, Finkenbach (DE)

(73) Assignee: BorgWarner Inc., Auburn Hills, MI (US)

( * ) Notice: Subject to any disclaimer, the term of this patent is extended or adjusted under 35 U.S.C. 154(b) by 465 days.

(21) Appl. No.: 13/393,669

(22) PCT Filed: Sep. 1, 2010

(86) PCT No.: PCT/US2010/047427
§ 371 (c)(1),
(2), (4) Date: Mar. 1, 2012

(87) PCT Pub. No.: WO2011/031595
PCT Pub. Date: Mar. 17, 2011

(65) Prior Publication Data
US 2012/0159946 A1    Jun. 28, 2012

(30) Foreign Application Priority Data

Sep. 10, 2009  (DE) .......................... 10 2009 041 074

(51) Int. Cl.
*F02D 23/00*    (2006.01)
*F04D 29/44*    (2006.01)
*F04D 29/54*    (2006.01)
*F02B 37/02*    (2006.01)
*F01D 9/02*    (2006.01)
(Continued)

(52) U.S. Cl.
CPC ................ *F02B 37/02* (2013.01); *F01D 9/026* (2013.01); *F01D 17/165* (2013.01); *F01N 13/107* (2013.01); *F02B 37/025* (2013.01); *Y02T 10/144* (2013.01); *F05D 2220/40* (2013.01)

(58) Field of Classification Search
CPC .......... F02B 37/18; F02B 37/00; F02B 37/02; F02B 37/025; F01D 17/165; F01D 9/026; F01N 13/107; F05D 2220/40; Y02T 10/144
USPC .............. 60/602; 415/205–206, 211.1–211.2, 415/184
See application file for complete search history.

(56) References Cited

U.S. PATENT DOCUMENTS

| 94,868 | A | * | 9/1869 | Chase ........................... 415/184 |
| 2,861,774 | A | * | 11/1958 | Buchi ........................... 415/205 |
| 3,005,618 | A | * | 10/1961 | Walder ........................... 415/184 |

(Continued)

FOREIGN PATENT DOCUMENTS

| DE | 19653057 A1 | * | 6/1998 | ................ F02C 6/12 |
| DE | 19744936 A1 | * | 4/1999 | ............. F02D 21/08 |

(Continued)

*Primary Examiner* — Thai Ba Trieu
(74) *Attorney, Agent, or Firm* — A. Michael Tucker; Stephan A. Pendorf; Patent Central LLC

(57) ABSTRACT

An exhaust-gas supply device (1) of a turbine wheel (2) of an exhaust-gas turbocharger (3), having a two-channel turbine housing (4) and an exhaust manifold (7) which can be connected to an internal combustion engine (8), which exhaust manifold (7) has a first manifold channel (9) which connects first cylinders (Z1, Z4) of the internal combustion engine (8) so as to form a first manifold exhaust-gas path length, and a second manifold channel (10) which connects second cylinders (Z2, Z3) so as to form a second manifold exhaust-gas path length, to generate virtually identical overall exhaust-gas path lengths of the two channels.

14 Claims, 6 Drawing Sheets

(51) Int. Cl.
 *F01D 17/16* (2006.01)
 *F01N 13/10* (2010.01)

(56) References Cited

U.S. PATENT DOCUMENTS

| | | | | |
|---|---|---|---|---|
| 3,137,477 | A | * | 6/1964 | Kofink ............... 415/205 |
| 3,383,092 | A | * | 5/1968 | Cazier ............... 415/205 |
| 3,930,747 | A | | 1/1976 | Woollenweber |
| 3,941,104 | A | * | 3/1976 | Egli ................. 60/612 |
| 4,177,006 | A | * | 12/1979 | Nancarrow ............ 415/205 |
| 4,395,884 | A | * | 8/1983 | Price ................ 60/602 |
| 4,582,466 | A | | 4/1986 | Szczupak |
| 6,324,847 | B1 | | 12/2001 | Pierpont |
| 6,651,431 | B1 | * | 11/2003 | Yang et al. ........... 415/211.2 |
| 6,941,755 | B2 | * | 9/2005 | Bucknell et al. ........ 60/602 |
| 7,047,739 | B2 | * | 5/2006 | Fledersbacher et al. ... 60/602 |
| 8,161,747 | B2 | * | 4/2012 | Pierpont et al. ........ 60/602 |
| 8,333,550 | B2 | * | 12/2012 | Fahl ................. 415/205 |
| 8,499,747 | B2 | * | 8/2013 | Schmalzl ............. 60/602 |
| 2003/0230085 | A1 | * | 12/2003 | Sumser et al. ......... 60/602 |
| 2004/0074480 | A1 | | 4/2004 | Chen et al. |
| 2009/0060719 | A1 | | 3/2009 | Haugen |
| 2013/0014497 | A1 | * | 1/2013 | Wu et al. ............ 60/323 |
| 2013/0283787 | A1 | * | 10/2013 | Sakata et al. ......... 60/605.1 |
| 2014/0331667 | A1 | * | 11/2014 | Kindl et al. .......... 60/602 |

FOREIGN PATENT DOCUMENTS

| | | | | |
|---|---|---|---|---|
| DE | 102007034235 A1 | * | 1/2009 | ........... F01D 9/00 |
| DE | 102007057310 A1 | * | 6/2009 | ........... F01N 13/107 |
| JP | 03151519 A | * | 6/1991 | ........... F02B 37/00 |
| WO | WO 2008028666 A1 | * | 3/2008 | ........... F02D 23/02 |

* cited by examiner

EXHAUST-GAS SUPPLY DEVICE OF A TURBINE WHEEL OF AN EXHAUST-GAS TURBOCHARGER

BACKGROUND OF THE INVENTION

1. Field of the Invention

The invention relates to an exhaust-gas supply device of a turbine wheel of an exhaust-gas turbocharger.

2. Description of the Related Art

A supply device of said type is known from DE 10 2007 017 826 A1 in the form of a two-channel gas flow supply with a first inlet duct and at least one second inlet duct.

In so-called ignition sequence exhaust manifolds of internal combustion engines, such as in particular of spark-ignition engines, in each case the exhaust gas of those cylinders which are not in direct succession in the ignition sequence is merged. For example, in a four-cylinder engine, cylinder 1 and cylinder 4 and also cylinder 2 and cylinder 3 are merged in the case of a cylinder ignition sequence of 1-3-4-2. This firstly permits, especially in four-cylinder engines, a reduction in the mutual influencing of the cylinders during the charge exchange as a result of lower residual gas contents, which leads to increased fresh gas charging, and it is secondly possible by means of channel separation to increase the flow speed, as a result of which a greater proportion of kinetic energy is imparted to the turbine wheel of a turbocharger which is coupled to the internal combustion engine, and therefore the turbine power is increased considerably.

If the generic supply device is to be combined with an ignition sequence exhaust manifold of said type, however, there are resulting efficiency disadvantages for the charge exchange of the internal combustion engine, and also for the chronological sequence of exhaust-gas pulsations on the turbine wheel, as a result of a non-uniform loading if the volume and the length of the first channel or of one inlet duct are significantly greater than the volume and the length of the second channel or of the other inlet duct.

BRIEF SUMMARY OF THE INVENTION

It is therefore an object of the present invention to create an exhaust-gas supply device which permits an improvement in the charge exchange of the internal combustion engine and an improvement of the chronological sequence of the exhaust-gas pulsations on the turbine wheel.

By means of said features, it is achieved that the volumes and the overall exhaust path lengths of the exhaust-gas guides from the cylinder outlet valve of the internal combustion engine to the end of the respective channel of the two-channel turbine housing of the exhaust-gas turbocharger can be kept as equal as possible or made considerably more even, which makes it possible to achieve the above-stated aim. Here, the two-channel turbine housing may be a twin-channel turbine housing with virtually identical spiral grooves or a double-channel turbine housing with either axially or radially adjacently arranged spiral channels of different lengths and/or volumes.

Here, the supply device according to the invention may be used both in spark-ignition engines with direct injection or intake pipe injection and also in diesel engines.

The subclaims relate to advantageous refinements of the invention.

BRIEF DESCRIPTION OF THE SEVERAL VIEWS OF THE DRAWINGS

Further details, advantages and features of the present invention will emerge from the following description of exemplary embodiments on the basis of the drawing, in which.

DETAILED DESCRIPTION OF THE INVENTION

Figure 1:
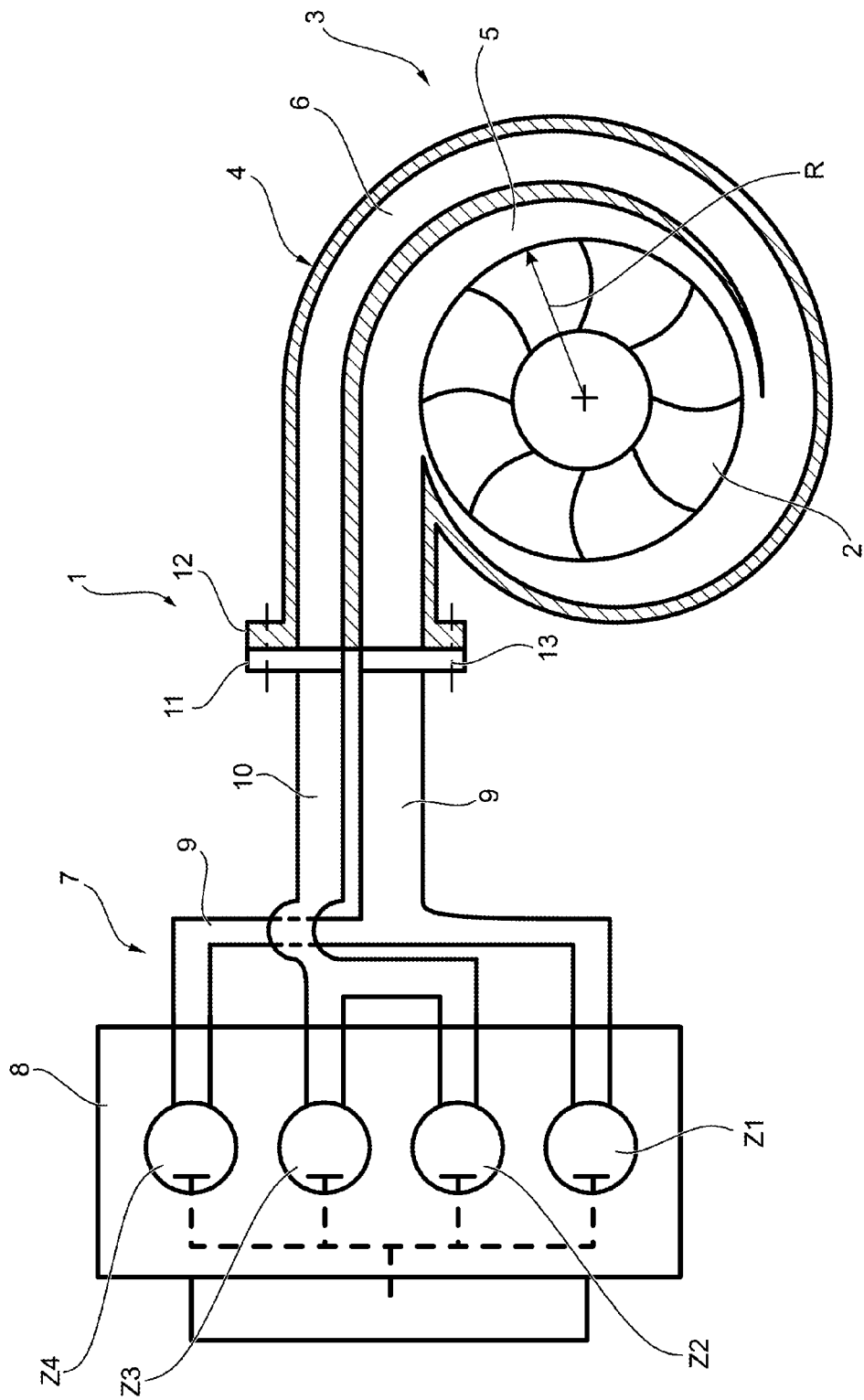
FIG. 1 shows a schematically highly simplified illustration of a first embodiment of the exhaust-gas supply device according to the invention.

FIG. 1 shows a schematically highly simplified illustration of an exhaust-gas supply device 1 according to the invention of a turbine wheel 2 of an exhaust-gas turbocharger, which is illustrated not in its entirety but rather representatively for all of its parts by the turbine housing 4 and which is identified by the reference numeral 3.

The turbine housing 4 is designed as a double-channel turbine housing with radially adjacently formed channels and has a first channel 5 as viewed in the radial direction R of the turbine wheel 2. Also provided is a second channel 6 as viewed in the radial direction R of the turbine wheel 2, which first and second channels run in each case in spiral form around the turbine wheel 2, with such a turbine housing design being known for example from WO 2008/028666 A1, the entire content of disclosure of which is hereby explicitly incorporated by reference in the content of disclosure of the present application.

The first channel 5 and the second channel 6 have different lengths on account of their geometric arrangement in the turbine housing 4, and may accordingly have different gas volumes, with the length of the second channel 6 being greater than that of the first channel 5.

As shown by FIG. 1, the turbine housing 4 is connected to an exhaust manifold 7 which in turn can be connected to an internal combustion engine which is symbolized by the block 8. In the example, the internal combustion engine 8 is a four-cylinder engine with the cylinders Z1 to Z4. It is however also conceivable for the present invention to be used with other engine types and numbers of cylinders (for example in-line six cylinder engines, V8 engines, V6 engines, six-cylinder boxer engines).

In the embodiment illustrated in FIG. 1, the exhaust manifold 7 has a first manifold channel 9 which connects the cylinders Z1 and Z4 of the internal combustion engine 8 so as to form a first manifold exhaust-gas path length. Furthermore, a second manifold channel 10 is provided which, in the illustrated embodiment, connects the cylinders Z2 and Z3 so as to form a second manifold exhaust-gas path length.

Here, on account of the construction of the four-cylinder engine illustrated by way of example in FIG. 1, the first manifold exhaust-gas path length is longer than the second above-described exhaust-gas path length.

To obtain exhaust-gas path lengths which are as equal as possible, as described in the introduction, the first manifold channel 9 is connected to the first channel 5 of the turbine housing 4 while the second manifold channel 10 can be connected to the second channel 6 of the turbine housing 4. In other words, this means that the first manifold channel 9, which constitutes the longer exhaust-gas path length, can be connected to the shorter channel, that is to say the first channel 5, of the turbine housing 4, whereas in the case of the second manifold channel 10, a connection is provided to the second channel 6, that is to say the longer channel of the turbine housing 4, in order to obtain the equalization of the overall path lengths as explained in the introduction.

In the embodiment illustrated in FIG. 1, for this purpose, a combined flange 12 of the turbine housing 4 is fastened to a gas inlet flange 11 of the exhaust manifold 7, for which purpose for example a conventional screw connection 13 may be provided. It is alternatively possible for the exhaust manifold 7 and the turbine housing 4 to be formed in one piece, for example as a cast part or welded part.

FIG. 1 also shows that in the example of a four-cylinder engine, the exhaust-gas turbocharger 3 is ideally arranged centrally between cylinder Z2 and cylinder Z3.

The aim of the approximately equal overall volumes and overall lengths of the two channels can in principle be achieved by means of two different combinations of manifold and turbine housing geometries.

Figure 6:
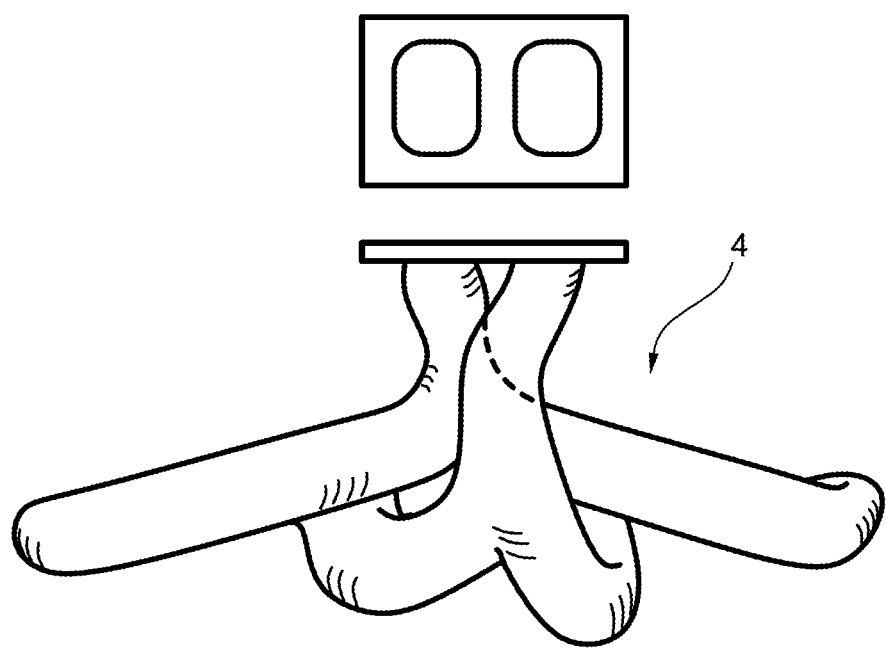
FIG. 6 shows a simplified illustration of an exhaust manifold variant.

A twin-channel turbine housing with virtually equal channels requires a manifold whose channels are likewise approximately equal (see FIG. 6). The combination of both then inevitably leads to virtually equal overall channels of the exhaust-gas supply unit.

A double-channel turbine housing with considerably different channels requires a manifold geometry with likewise different channels. By means of a corresponding combination of short and long individual channels of the turbine housing and manifold, it is possible to obtain approximately equal overall channels of the exhaust-gas supply unit.

Figure 2:
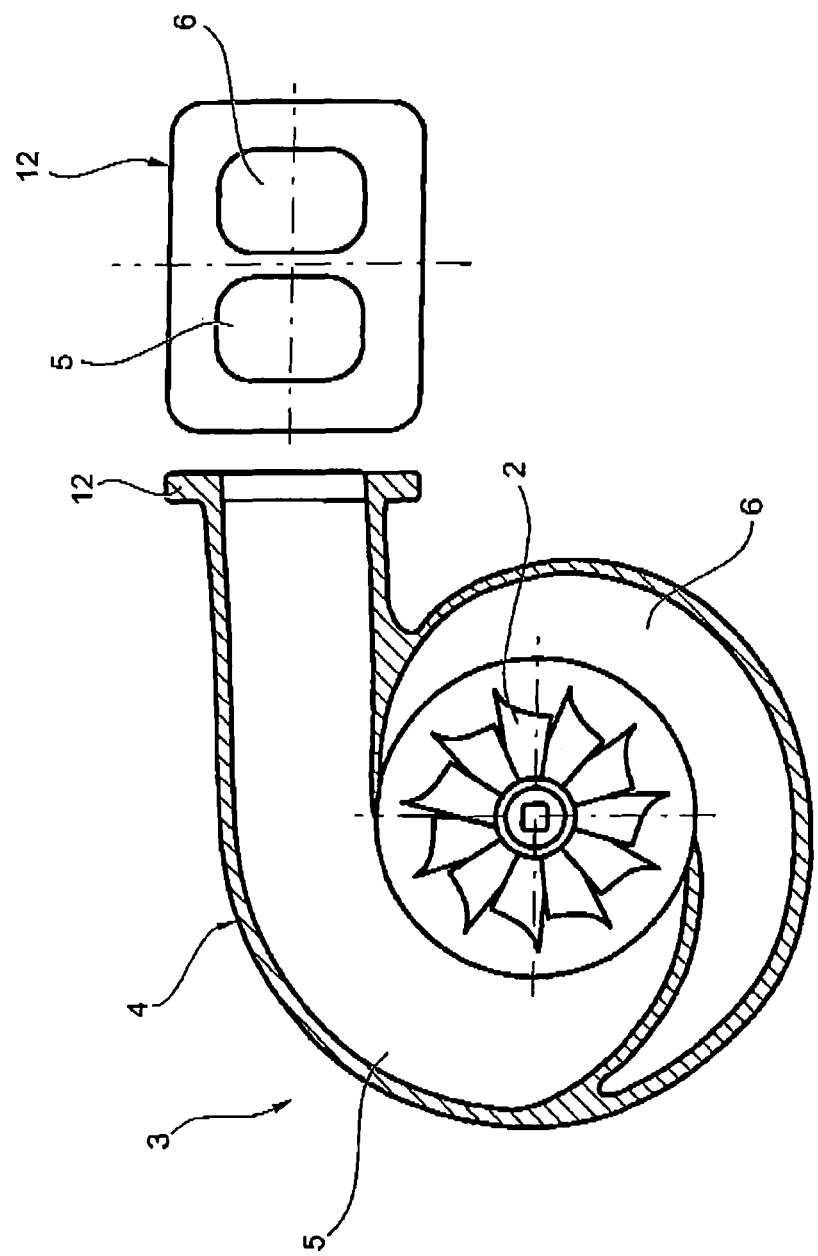
FIG. 2 shows an illustration, corresponding to FIG. 1, of a double-channel turbine housing which can be combined with an exhaust manifold to form a second embodiment of the exhaust-gas supply device according to the invention.

The embodiment according to FIG. 2 illustrates a double-channel turbine housing with axially adjacent spiral channels 5 and 6. Said embodiment corresponds substantially to that of FIG. 1, such that the same reference numerals have been used and such that, with regard to all correlating features, reference may be made to the above description of FIG. 1.

Figure 3:
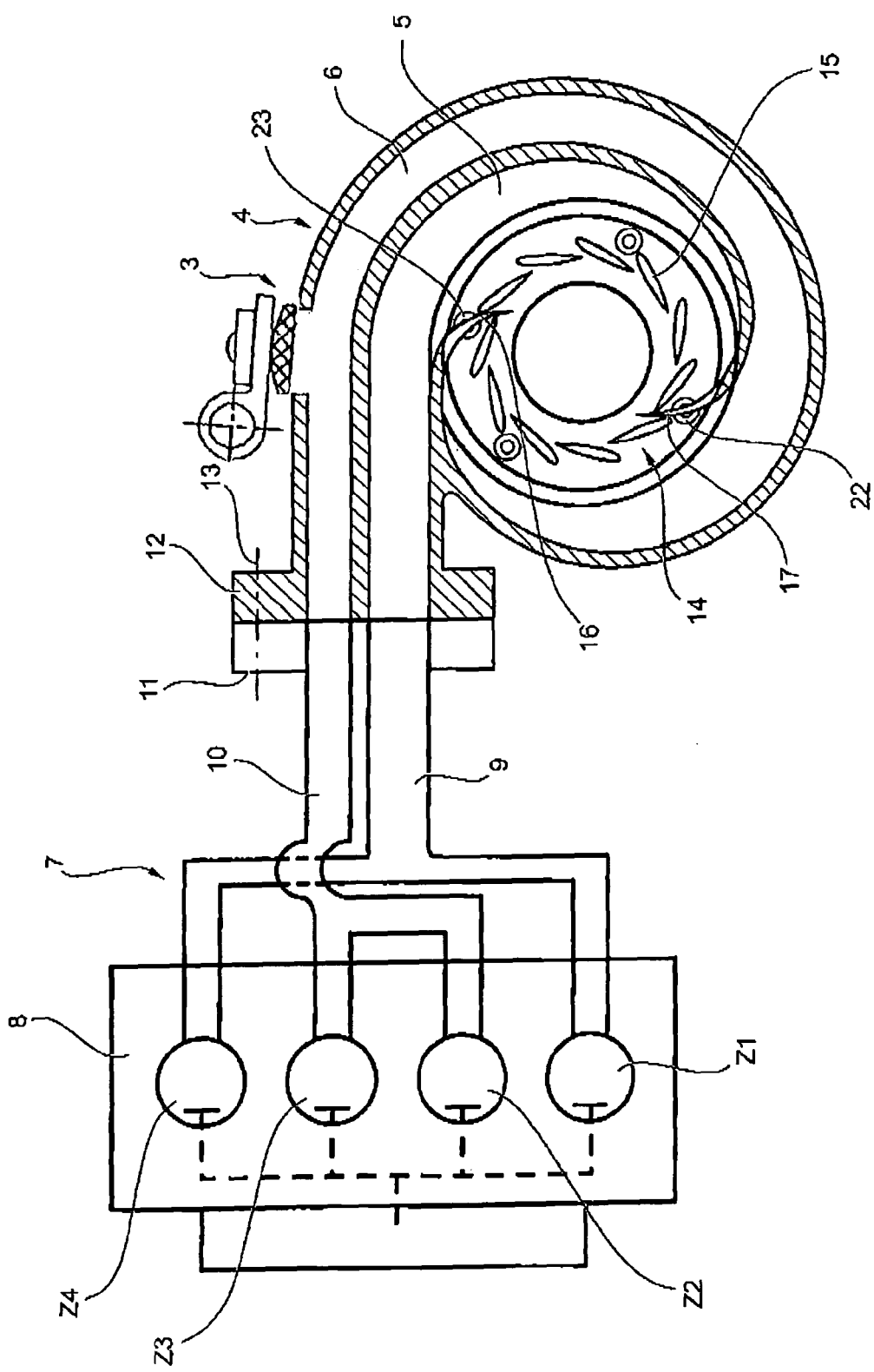
FIG. 3 shows an illustration, corresponding to FIG. 1, of a third embodiment of the exhaust-gas supply device according to the invention.

The turbocharger 3 according to FIG. 3 is a turbocharger with variable turbine geometry, such that the turbine housing 4 has a guide apparatus 14 with a multiplicity of adjustable blades, one of which is denoted, representatively for all of the blades, by the reference numeral 15. The other components of a variable turbine geometry of said type are not illustrated in FIG. 2 because they are not required for explaining the principles of the present invention. In the particularly preferred embodiment according to FIG. 2, the guide apparatus 14 is provided with a guide apparatus channel separation 16, 17 which constitutes an elongation of the channel separation of the two channels 5 and 6 into the region of the guide apparatus 14, that is to say between the blades 15. For this purpose, it is for example possible for webs as shown in FIGS. 2 and 3 to be integrated in the guide apparatus, with it also being possible for this purpose to use spacer elements 23, 22 that are provided in the guide apparatus 14 in any case or to combine said spacer elements with webs, such as in the case of the webs 18 and 19 (see FIG. 4).

Figure 4:
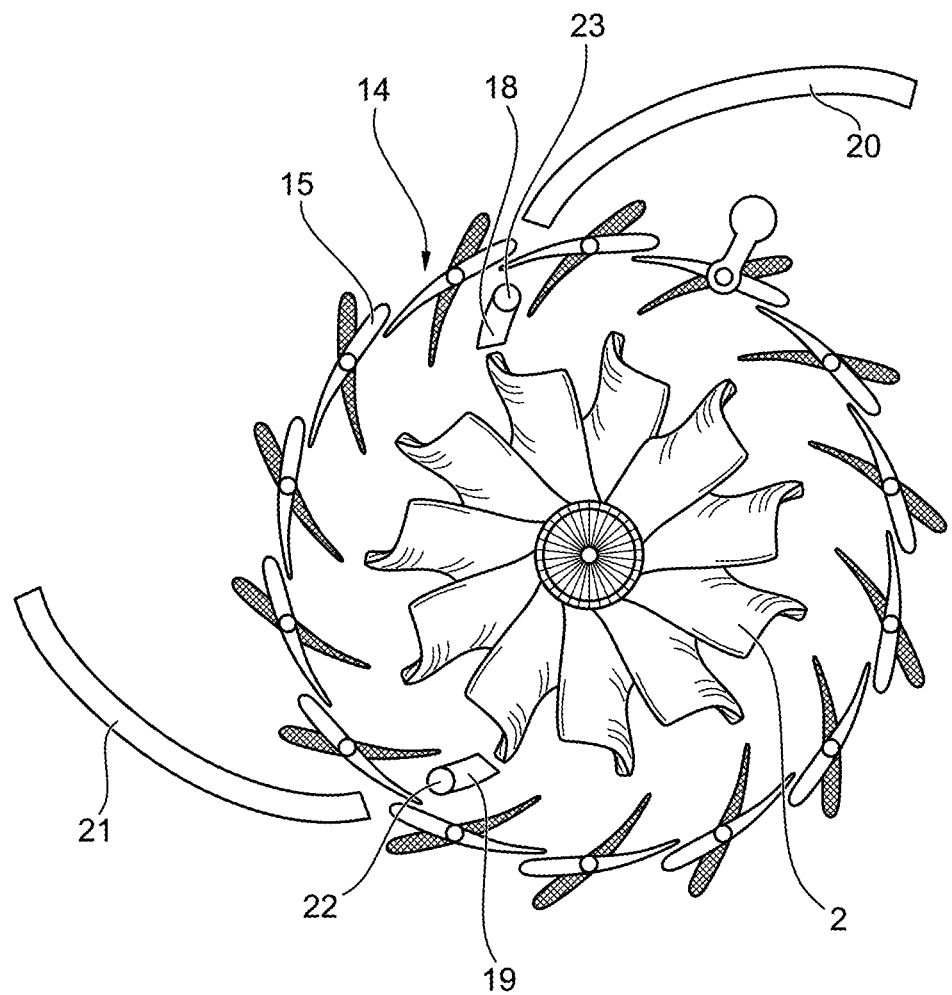
FIG. 4 shows a schematically highly simplified plan view of a guide apparatus of a turbine housing of the exhaust-gas supply device according to the invention with variable turbine geometry.

As can be seen in particular from FIG. 4, this results in an elongation of the channel separations 20 and 21 in the turbine housing 4 into the region of the guide grate 14.

Figure 5:
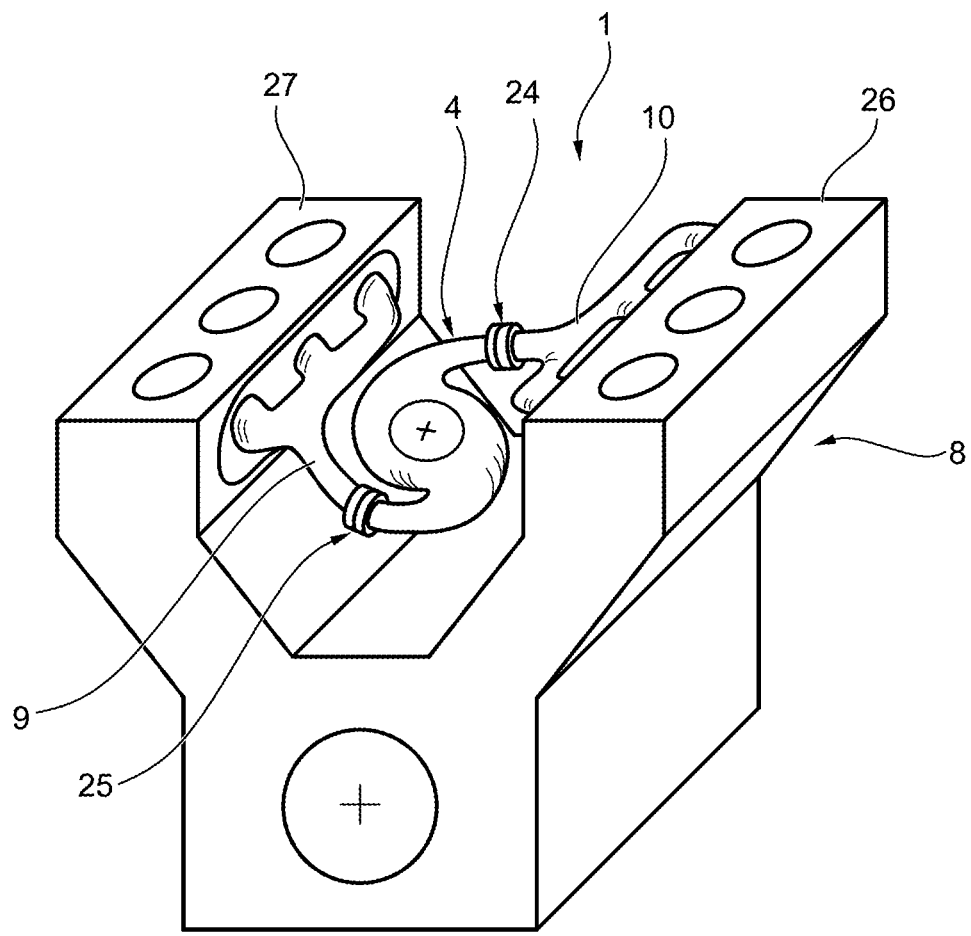
FIG. 5 shows a schematically highly simplified illustration of a further variant according to the invention with separate flanges.

The manipulation of the exhaust-gas path lengths of the two channels in the turbine housing 4 may also be achieved by dispensing with a common flange and arranging a plurality of flanges 24, 25 at different positions on the circumference of the turbine housing 4, as illustrated in FIG. 5. This is expedient in particular in the case of a V engine, in which the turbine housing 4 may be arranged in the "V" of the engine 8 and each cylinder bank 26, 27 forms a channel 10 and 9 respectively, which can be guided separately to the turbine housing 4 and provided with a separate flange 24 and 25 respectively. It is preferable here for the two flanges 24, 25 to be arranged oppositely or offset by 180°.

It is also possible to apply the principles according to the invention to a turbine housing having a wastegate flap device. The combination of a variable turbine geometry and a wastegate flap is also possible.

In addition to the above written disclosure of the invention, reference is hereby additionally made to the diagrammatic illustration of the invention in FIGS. 1 to 6.

LIST OF REFERENCE SYMBOLS

1 Exhaust-gas supply device
2 Turbine wheel
3 Exhaust-gas turbocharger
4 Turbine housing
5 First channel
6 Second channel
7 Exhaust manifold
8 Internal combustion engine
9 First manifold channel
10 Second manifold channel
11, 12 Flanges
13 Screw connection
14 Guide apparatus
15 Blades
16, 17 Channel separation in the guide grate 14
18, 19 Webs for channel separation
20, 21 Channel separation in the turbine housing 4
22, 23 Spacer elements
24, 25 Flanges
26, 27 Cylinder bank
Z1-Z4 Cylinders
R Radial direction

The invention claimed is:

1. An exhaust-gas supply device (1) of a turbine wheel (2) of an exhaust-gas turbocharger (3), comprising:
 a two-channel turbine housing (4) having a first channel (5) with a short spiral length for forming a first volume and a second channel (6) having a long spiral length for forming a second volume, and
 an exhaust manifold (7) connected to an internal combustion engine (8),
  wherein the exhaust manifold (7) further includes:
   a first manifold channel (9) which connects first cylinders (Z1, Z4) of the internal combustion engine (8) so as to form a longer manifold exhaust-gas path length having a first volume, and
   a second manifold channel (10) which connects second cylinders (Z2, Z3) so as to form a shorter second manifold exhaust-gas path length having a second volume,
    wherein the first manifold channel (9) having the longer manifold exhaust-gas path length is connected to the turbine housing (4) first channel (5) having the short spiral length, and the second manifold channel (10) having the shorter manifold exhaust-gas path length is connected to the turbine housing (4) second channel (6) having the long spiral length whereby the first and second manifold channels (9, 10) in combination with the first and second channels (5, 6) of the turbine housing (4) generate virtually identical overall exhaust-gas path lengths of combined channels (9, 10, 5, 6) from the engine to the turbine wheel.

2. The supply device as claimed in claim 1, wherein the two combined channels have approximately identical overall volumes.

3. The supply device as claimed in claim 1, wherein the turbine housing (4) is a double-channel housing.

4. The supply device as claimed in claim 1, wherein the turbine housing (4) is a twin-channel housing.

5. The supply device as claimed in claim 1, wherein the turbine housing (4) is provided with a variable turbine geometry with a guide apparatus (14) and adjustable blades (15).

6. The supply device as claimed in claim 5, wherein the guide apparatus (14) is provided with a guide apparatus channel separation (16, 17, 18, 19).

7. The supply device as claimed in claim 1, wherein the turbine housing (4) is provided with a variable turbine geometry with a guide apparatus (14) with adjustable blades (15) and a wastegate flap.

8. The supply device as claimed in claim 1, wherein the turbine housing (4) is provided with a wastegate flap device.

9. The supply device as claimed in claim 1, wherein the turbine housing (4) and the exhaust manifold (7) are connected to one another via a releasable connecting device.

10. The supply device as claimed in claim 9, wherein the connecting device is designed as a flange connection (11, 12) with a screw connection (13).

11. The supply device as claimed in claim 10, wherein the first and second channels (5, 6) of the turbine housing (4) have spatially differently positioned flange connections.

12. The supply device as claimed in claim 1, wherein the turbine housing (4) and the exhaust manifold (7) are formed in one piece with one another.

13. The supply device as claimed in claim 12, wherein the turbine housing (4) and the exhaust manifold (7) are welded or are formed as a single-piece cast part.

14. A method for optimizing the imparting of exhaust gas kinetic energy to a turbine wheel (2) of an exhaust-gas turbocharger (3), the method comprising:

selecting a turbocharger having a two-channel turbine housing (4) which has a first channel (5) having a short spiral length for forming a first volume and a second channel (6) having a long spiral length for forming a second volume, selecting an exhaust manifold (7) adapted to being connected to an internal combustion engine (8), wherein the exhaust manifold (7) further includes:

a first manifold channel (9) which connects first cylinders (Z1, Z4) of the internal combustion engine (8) so as to form a longer manifold exhaust-gas path length having a first volume, and a second manifold channel (10) which connects second cylinders (Z2, Z3) so as to form a shorter manifold exhaust-gas path length having a second volume, and connecting the first manifold channel (9) having the longer manifold exhaust-gas path to the turbine housing (4) first channel (5) having the short spiral length, and the second manifold channel (10) having the shorter manifold exhaust-gas path length to the turbine housing (4) second channel (6) having the long spiral length whereby the first and second manifold channels (9, 10) with the first and second channels (5, 6) of the turbine housing (4) generate virtually identical overall exhaust-gas path lengths of combined channels (9, 10, 5, 6) from the engine to the turbine wheel.

\* \* \* \* \*